US011228433B2

(12) United States Patent
Dharmarajan (10) Patent No.: US 11,228,433 B2
(45) Date of Patent: Jan. 18, 2022

(54) CLOUD BASED MULTI-KEY AUTHORIZATION BASED SYSTEM

(71) Applicant: Baskaran Dharmarajan, Palo Alto, CA (US)

(72) Inventor: Baskaran Dharmarajan, Palo Alto, CA (US)

(*) Notice: Subject to any disclaimer, the term of this patent is extended or adjusted under 35 U.S.C. 154(b) by 172 days.

(21) Appl. No.: 16/453,831

(22) Filed: Jun. 26, 2019

(65) Prior Publication Data

US 2020/0007326 A1 Jan. 2, 2020

Related U.S. Application Data

(60) Provisional application No. 62/693,137, filed on Jul. 2, 2018.

(51) Int. Cl.
*H04L 9/08* (2006.01)
*G06F 21/60* (2013.01)
*H04L 9/14* (2006.01)

(52) U.S. Cl.
CPC .......... *H04L 9/0894* (2013.01); *G06F 21/602* (2013.01); *H04L 9/14* (2013.01)

(58) Field of Classification Search
CPC ....... H04L 9/0894; H04L 9/14; H04L 9/0822; G06F 21/602
USPC ........................................................ 713/193
See application file for complete search history.

(56) References Cited

U.S. PATENT DOCUMENTS

| | | | | |
|---|---|---|---|---|
| 8,995,654 | B2* | 3/2015 | Tang | H04L 9/3242 380/44 |
| 2009/0034722 | A1* | 2/2009 | Zaharris | G11B 20/00695 380/44 |
| 2010/0306635 | A1* | 12/2010 | Tang | H04L 9/0894 714/807 |
| 2012/0297200 | A1* | 11/2012 | Thom | G06F 21/6209 713/189 |
| 2014/0177839 | A1* | 6/2014 | Wagner | G06F 21/60 380/259 |
| 2016/0087950 | A1* | 3/2016 | Barbir | H04L 63/062 713/171 |
| 2018/0309734 | A1* | 10/2018 | Yu | G06F 21/606 |
| 2019/0130068 | A1* | 5/2019 | Gondek | H04L 63/0442 |
| 2019/0156043 | A1* | 5/2019 | Chhabra | H04L 9/08 |
| 2019/0372758 | A1* | 12/2019 | Tevosyan | H04L 9/0861 |
| 2020/0280449 | A1* | 9/2020 | Shankar | H04L 9/3242 |

* cited by examiner

*Primary Examiner* — Teshome Hailu
(74) *Attorney, Agent, or Firm* — Chhabra Law Firm, PC (57) ABSTRACT

Using various embodiments, methods and systems for securing user data are described. In one embodiment, a system includes a server side application accessing a service key from a conventional key vault and an escrowed key which can then be used to compute a key to the key using which information can be encrypted. Other embodiments include using a timer service to further safeguard secure user information.

14 Claims, 11 Drawing Sheets

Timer-Storage Service

CLOUD BASED MULTI-KEY AUTHORIZATION BASED SYSTEM

CROSS REFERENCE TO RELATED APPLICATIONS

The present application claims priority from U.S. Provisional Patent Application No. 62/693,137 filed on Jul. 2, 2018 under 35 U.S.C. 119(e), the contents thereof are incorporated herein by reference, for all purposes to the extent that such subject matter is not inconsistent herewith.

FIELD OF THE INVENTION

Embodiments of the present invention relates generally to the field of securing authorization based sensitive data in a computer system. More particularly, embodiments of the invention relate to a multi-key authorization system for software applications that access sensitive or confidential information on behalf of a user.

BACKGROUND OF THE INVENTION

Cloud and on-premises ("on-perm") software applications need to often store a lot of sensitive and/or confidential information about users—OAuth tokens or equivalent, credit cards, social security numbers and other sensitive personal details. The need to store this sensitive and/or confidential data can vary from avoiding repeated filling of forms, periodic processing (e.g., charging credit cards for subscriptions, running reports etc.) to performance based on notifications from related services (e.g., a Facebook based application performing certain actions based on notifications and/or updating information based on user action, etc.) To do this, the cloud and on-prem apps must store the offline OAuth tokens (including refresh tokens) or the equivalent in other authentication schemes.

Storing such information requires a server-side application ("app" or "SSA"), to store personal secrets such as OAuth/Open ID/other security tokens related to popular services such as email providers, social networks, credit cards, etc., for all its users. With a popular server-side application this could mean saving confidential or sensitive information of thousands to millions of users and if the security of the SSA is breached, the confidential and/or sensitive information of all the users can be compromised.

Thus, what is needed is techniques that prevent access to confidential and/or sensitive information of users even when the security of the SSA is breached.

SUMMARY OF THE DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system, including a memory device and a processing system, including at least one hardware core that is coupled to the memory device. In such a system, the processing system can be configured to retrieve a first key, the first key stored at first key management service, retrieve a second key, the second key stored at a second key management service, generate a third key, where the third key generated by associating the first key with the second key. The system can encrypt a key blob using the third key, the key blob including a user key, where the user key is used to encrypt sensitive information. The sensitive information is any data related to a user that needs to be protected. The system stores the key blob, where the key blob is indexed using a first identifier. Other embodiments of this aspect include corresponding computer systems, apparatus, and computer programs recorded on one or more computer storage devices, each configured to perform the actions of the methods.

Implementations may include one or more of the following features. In one embodiment, the system can further be configured to store a second identifier, where the second identifier includes the first identifier and identification information of the first and second keys, and where the second identifier is transmitted to a requestor that requires decrypting the sensitive information. In another embodiment, the system can be configured to transmit the second identifier upon verification that the second identifier was requested within a predetermined period of time. In one embodiment, the second identifier is transmitted in response to receiving a timer identifier that is associated with the second identifier. In one embodiment, the first key is a key related to a service or application, and the second key is an escrowed key. In one embodiment, the first and second keys can be associated by applying at least one of a logic operator or algorithm on the first and second keys to generate the third key. In yet another embodiment, the third key is generated at least by applying an exclusive or (XOR) based logic operator on the first and second keys. Implementations of the described techniques may include hardware, a method or process, or computer software on a computer-accessible medium.

BRIEF DESCRIPTION OF THE DRAWINGS

The present invention is illustrated by way of example and not limitation in the FIGS. of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the FIGS. that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Since embodiments of the invention described herein relate to a system for software applications that access sensitive or confidential information on behalf of a user, any reference to a multi-key authentication system generally refers to a system that can authenticate a user, authorize a user, or a combination thereof.

Figure 1:
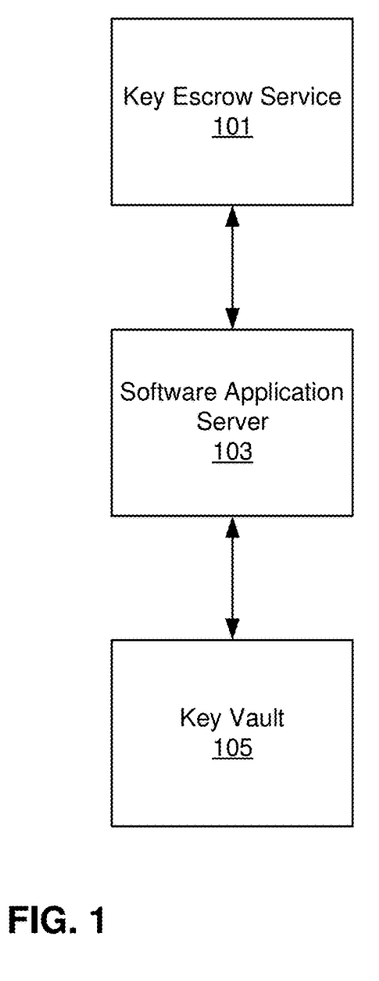
FIG. 1 illustrates a block diagram of a multi-key authentication system, according to one embodiment of the present invention.

FIG. 1 illustrates a block diagram of a multi-key authentication system, according to one embodiment of the present invention. As illustrated, a cloud multi-key authentication (MKA) system is described. The system includes a SSA 103 accessing a service key from a conventional key vault 105 and an escrowed key service 101 which can then be used to compute another key using which information can be encrypted (also referred to as dual key cryptography herein). A key vault, as referred to herein, means a key management service that provide secure storage for SSA keys (e.g., Azure Key Vault, AWS/Google Cloud Key Management Service, or hardware based security modules such as AWS Cloud HSM, IBM Key Protect, etc.). The cloud MKA provides at least three the features of simple intrusion guarantee, single code injection guarantee, and time-limited code injection guarantee. Thus, if a malicious actor gets access to the hard drives where the cloud app stores sensitive data, the malicious actor will not be able to compromise any confidential and/or sensitive information. If a malicious actor gets access a configuration related information (e.g., key vault) using which it accesses the data storage, no confidential/sensitive information will be compromised.

Similarly, if a malicious actor gets access to only one of the server machines and sets up network tracing or injects malicious code into the server application on that machine, the malicious actor will only be able to access the unencrypted sensitive data that is processed on the machine, and not all the server machines used by the SSA.

The cloud MKA can also protects SSAs if the malicious actor manages to inject malicious code into an SSA or sets up a sniffer on every machines running the SSA. In such a scenario, the malicious actor would only be able to steal sensitive data accessed within the duration of breach of privilege and will not be able to maintain the breach. For example, in a typical setup where an SSA stores all the sensitive information for its users in a database protected by a server-side key, once a hacker compromises the key and gains access to the database via a breach, the hacker can steal of the contents of the database and even decrypt and use offline even after the breach is detected and patched. However, in a system implementing the techniques described herein, the hacker would only be able to maintain the breach during the duration of the original breach.

Figure 2A:
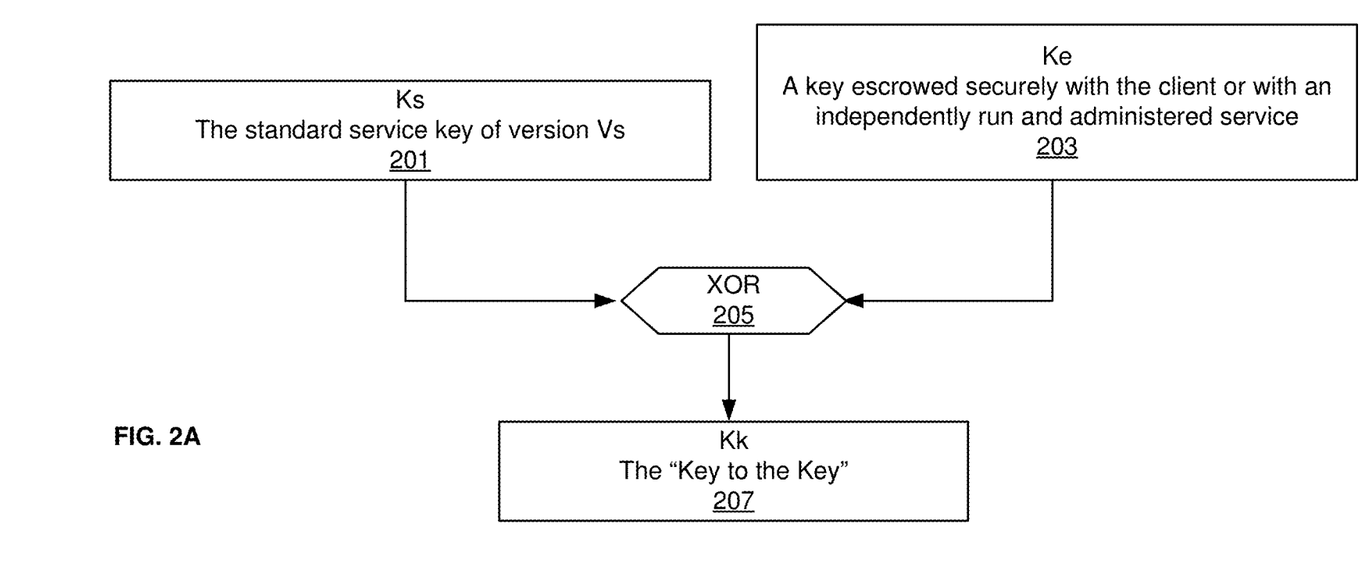
FIG. 2A illustrates generation of a secure key for use by a multi-key authentication system, according to one embodiment of the present invention.

FIG. 2A illustrates generation of a secure key based on dual cryptography for use by a multi-key authentication system, according to one embodiment of the present invention. As illustrated, Ks 201 is a standard service key, usually stored in a Key Vault (e.g., vault 105). Ke 203 is a key escrowed either with the client (client side software application) or with an independently administered and secured service (e.g., service 101). In one embodiment, the standard service key is versioned and can be periodically updated. The desired version of this key for a given transaction is represented by the variable called Vs. In one embodiment, an 'exclusive-or' (XOR) logic operator 205 can be applied to Ks 201 (associated the Version Vs) and Ke 203, resulting in Ks XOR Ke to generate a "Key to the key" 207 (Kk). In another embodiment, any appropriate logic operator or algorithm can be applied on Ks 201 and Ke 203 to generate Kk 207. In another embodiment, double wrapping can be applied, that is, the sensitive information is encrypted with Ks first and then Ke so that decryption occurs in a reverse order. It should be noted, although for ease of understanding some embodiments in this document describe implementation of the XOR logic operation or algorithm, a person having ordinary skill in the art would appreciate that those embodiments can use any of the aforementioned logic operator or algorithms, or a combination thereof, in their respective implementations.

Figure 2B:
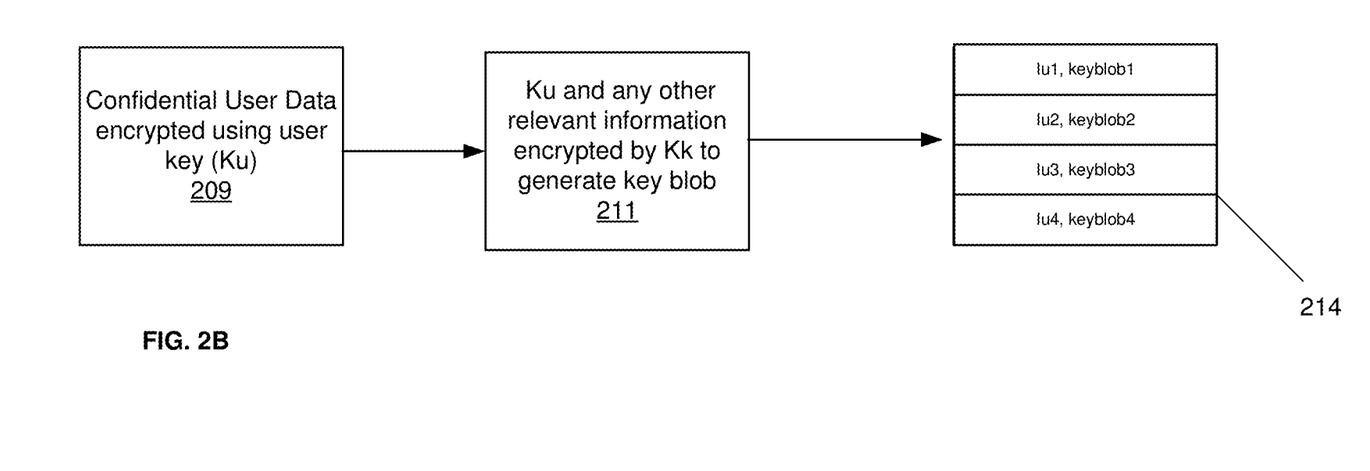
FIG. 2B illustrates securing data and associated keys for use by a multi-key authentication system, according to one embodiment of the present invention.

FIG. 2B illustrates securing data and associated keys for use by a multi-key authentication system, according to one embodiment of the present invention. In one embodiment, sensitive data can be encrypted with a Per-User key called Ku as illustrated at 209. Ku can be used to encrypt all sensitive data for a user or the scheme can be adapted for creating per-user-per-purpose data or per-purpose data that is accessed by the system, illustrated at 211. A package, called a key blob, containing Ku and any other information (e.g., lookup data, user ID, etc.) is stored encrypted by Kk in a data base that is indexed by a random identifier (Iu), as illustrated at 214. Optionally, along with the Key-blob, timestamp information such as, when the record was accessed last and when it was created could be stored. This can allow disposal or cleanup of stale entries, if needed.

Figure 3:
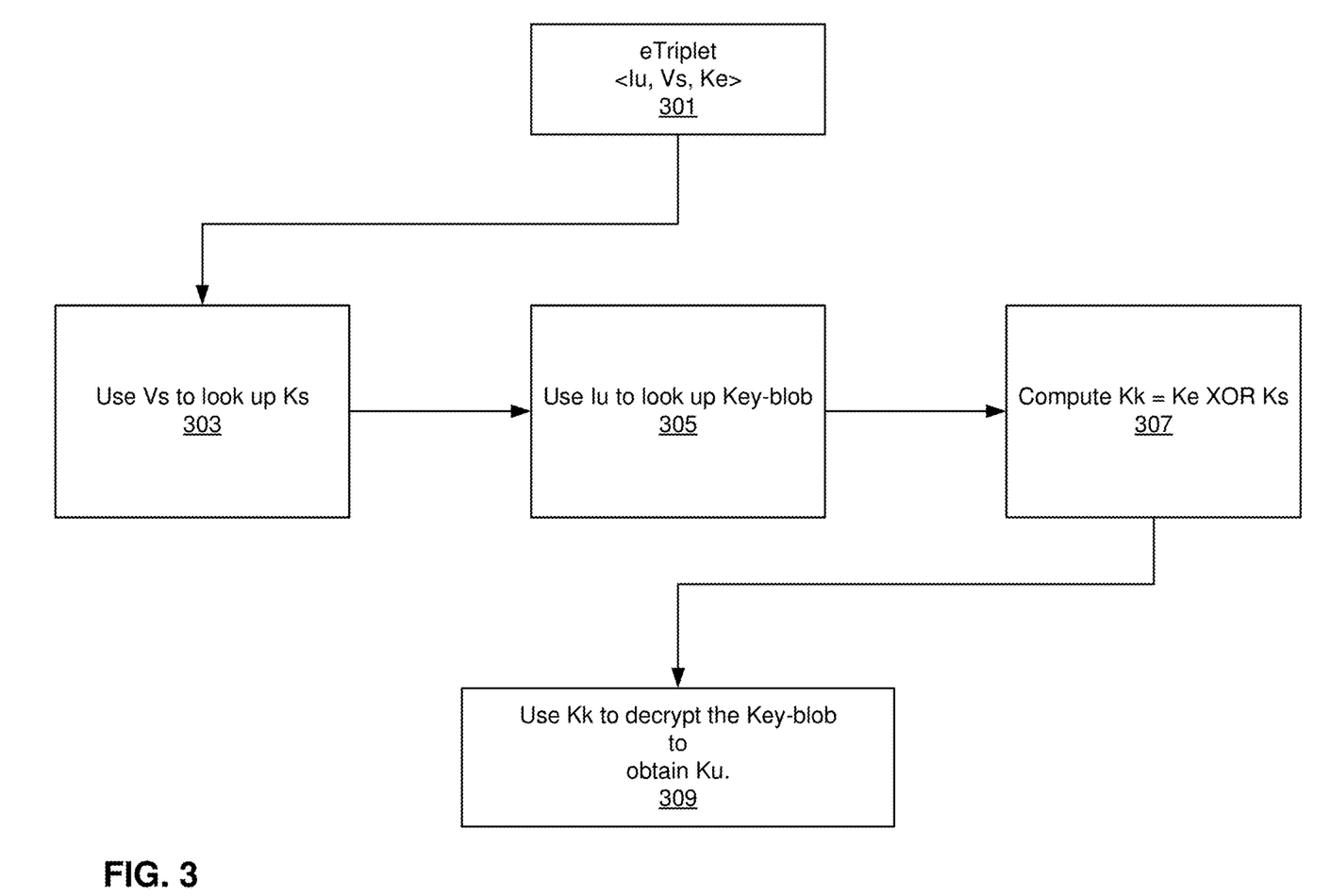
FIG. 3 illustrates a process to retrieve secure data by using a multi-key authentication system, according to one embodiment of the present invention.

FIG. 3 illustrates a diagram to retrieve secure data by using a multi-key authentication system, according to one embodiment of the present invention. As illustrated, to retrieve secure user data, a system implementing the cloud-MKA needs access to Ku. In one embodiment, to access Ku, the system would first need to determine Vs associated with the secure data, and Iu to locate the correct key-blob version. The system would also need to determine Ke that is used to generate Kk, such that Ks XOR Ke can compute Kk that was used to encrypt the key blob. As can be appreciated by a person of ordinary skill in the art, knowing a user ID itself would not be sufficient and would not provide the ability to guess which Iu is associated with the user of the user ID. Thus, to decrypt a key blob and access the secure data, the system would need to have access to a triplet of Iu, Ke and Vs as illustrated at 301. This triplet is, herein, called an Escrowed triplet (eTriplet). At 303, a lookup using Vs can be performed to determine Ks. At 305, Iu can be used to determine Key-blob. Thereafter, at 307, Kk is computed and at 309 Kk is used to decrypt key-blob to obtain user key Ku.

In one embodiment, Vs allows Ks to be updated as needed. Thus, old versions of Ks can co-exist with newly added key versions. In one embodiment, all new encryptions can be performed using a new key and the old version of the key can be used for any calls from external parties that are already set up. In yet another embodiment, the old versions of the key can be associated with an expiration cut off time. Similarly, an old version of a key can also be revoked if it were compromised.

In one embodiment, whenever new data is available that needs to be secured, a new Ku can be generated along with a new eTriplet. In a preferred embodiment, Ku is updated on a regular interval as deemed appropriate by a person of ordinary skill in the art. In yet another embodiment, whenever an eTriplet leads to invalid or nonexistent data, the blob indexed by Iu can be removed from the data store. SSAs can also be configured to delete key blob records that have not been accessed in a very long time or those that have been compromised.

In one embodiment, a system implementing cloud MKA can call for several services where an SSA can store eTriplets and access the data securely when needed. In order to secure data using cloud MKA systems, in a preferred embodiment, these services can be independently administered and secured. Therefore, services using cloud MKA should not be maintained by any entity or person who maintains the SSA. Further it is preferred that the service runs on a different cloud fabric/set up that is secured and architected differently. The services are generally expected to run on the cloud, but they could be run inside a corporate network as well.

In one embodiment, all calls to Cloud MKA services are authenticated either using a preconfigured SSL-certificate or a client-secret (that is, calls can be made to these services only from administratively configured and pre-registered SSAs). Each such preconfigured SSA would need associated identification data, called the App-ID that uniquely identifies the SSA to the service.

The eTriplet can be stored on an external store, the SSA, or the client application. When storing the eTriplet externally on one of the eTriplet stores, it is preferable that it is encrypted. To do this, the SSA can use a key called eTriplet-Store-Blob-Key or Simply the Triplet-Key, Kt, that is versioned with eTriplet-Store-Blob-Key-Version (or Simply the Triplet-Key-Version) Vt.

Therefore, similar to the association of Ks to Vs, Vt allows Kt to be updated as or when needed (e.g., by the SSA or the user). Thus, the old version of the key can work separately from a newly added key and all new encryptions are performed using the new key. The old version can be used for any calls from external parties that are already set up. But the old version will not be honored after a certain cut off time. The old version can be revoked if there is a compromise.

In one embodiment, the eTriplets is stored in an encrypted format on a secure computing system that can be accessed by the cloud MKA system. The computing system can be a client-side application. In one embodiment, the eTriplet can only be accessed when valid credentials are provided. Thus, compromising the store may lead to replay attacks but never a compromise of the decrypted eTriplet.

Figure 4:
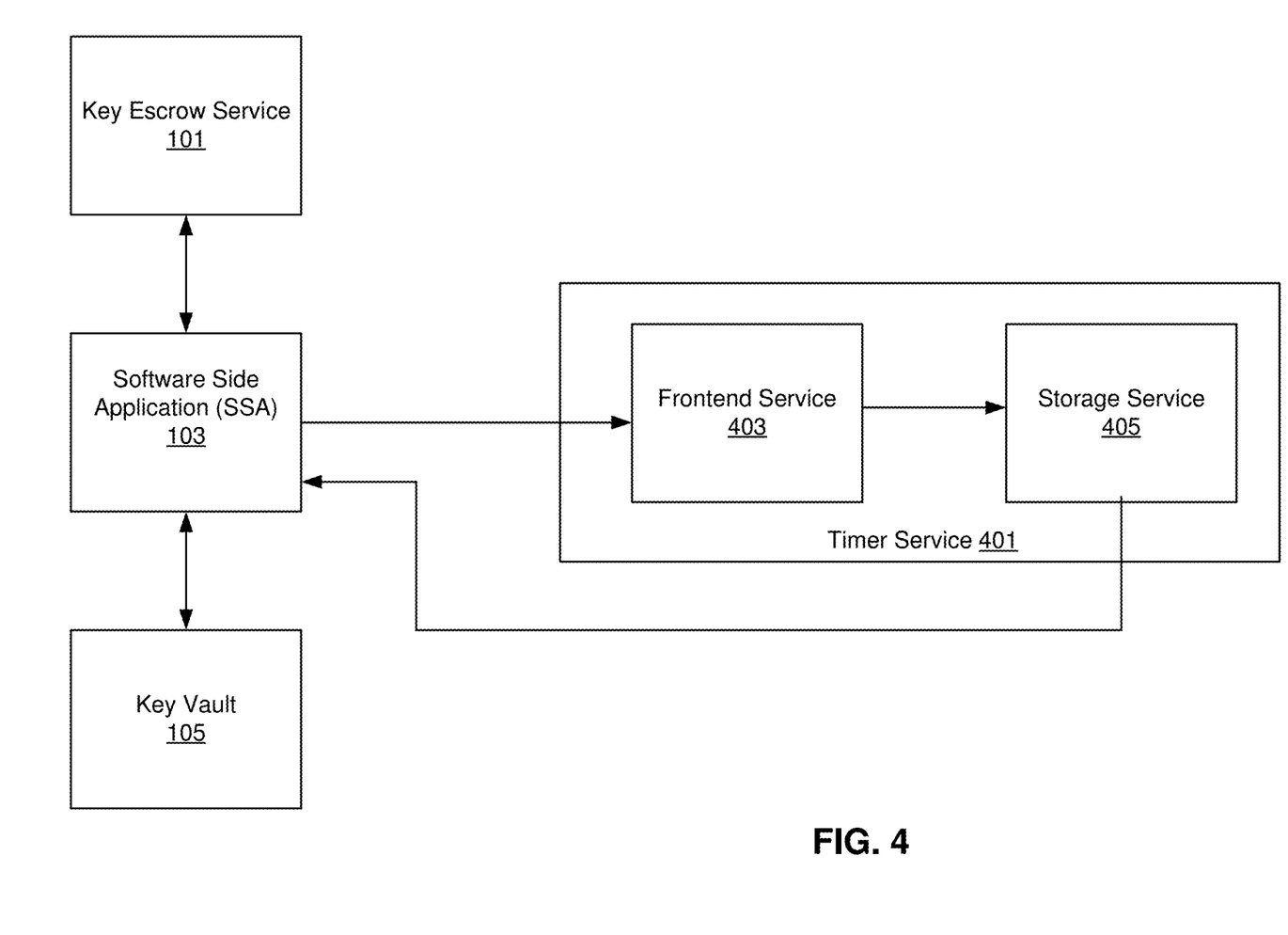
FIG. 4 illustrates a block diagram of a multi-key authentication system using a timer service, according to one embodiment of the present invention.

FIG. 4 illustrates a block diagram of a multi-key authentication system using a timer service, according to one embodiment of the present invention. Generally, SSAs often run background tasks without any user intervention. This is often the reason why sensitive secrets are stored encrypted with a server key (which makes it easy to decrypt once the SSA is hacked into) or stored in the plain, which is known to cause numerous security problems. As illustrated, SSA 103 can, in one embodiment, use timer service 401 that can assist with running non-user-initiated background-tasks that are performed at a scheduled time for SSA 103. Examples of such background tasks include charging a subscription fee to a credit card, pulling data from another service such as a social network or an email service, etc. Timer service 401 can assist with the situation such that the background tasks can run relatively efficiently without ever being under the risk of mass breaches of sensitive data. As illustrated, SSA 103 interacts with the key vault 105 and escrow service 101 to retrieve and/or decrypt sensitive information using the timer service 401. In one embodiment, timer service 401 can comprise a frontend service 403 that interacts with SSA 103 and a backend storage service 405 that responds back to SSA 103 after receiving a request from SSA 103 via frontend service 403, as further described.

Figure 5:
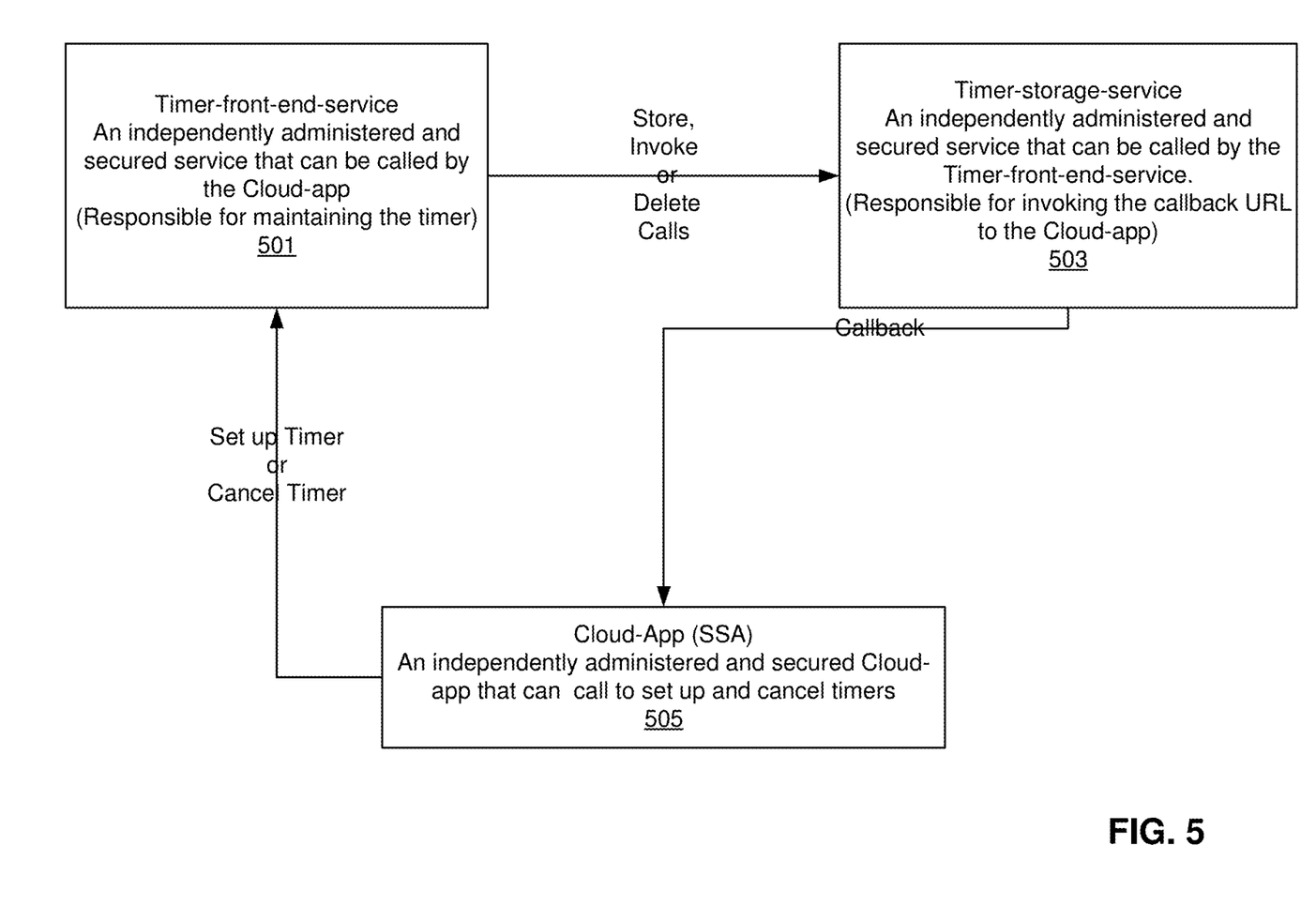
FIG. 5 illustrates the interactions between a frontend timer service, a timer storage service, and a software application server using a multi-key authentication system, according to one embodiment of the present invention.

FIG. 5 illustrates the interactions between a frontend timer service 401, a timer storage service 405, and a software application server 103 using a multi-key authentication system, according to one embodiment of the present invention. As illustrated in FIG. 4, timer service 401 can include timer frontend service 403 that serves as the frontend to SSA 103 and a timer storage service 405 that interacts directly with SSA 103 upon receiving a request from timer frontend service 403. Even though the two services, 403 and 405, form a pair operationally, in a preferred embodiment, they are independently administered and secured, similar to all other Cloud MKA services. As illustrated, the timer front end service 403 is responsible for maintaining a timer during which information would be made available for a background service. The timer storage service 405 is responsible for invoking a call back to SSA 103.

Figure 6A:
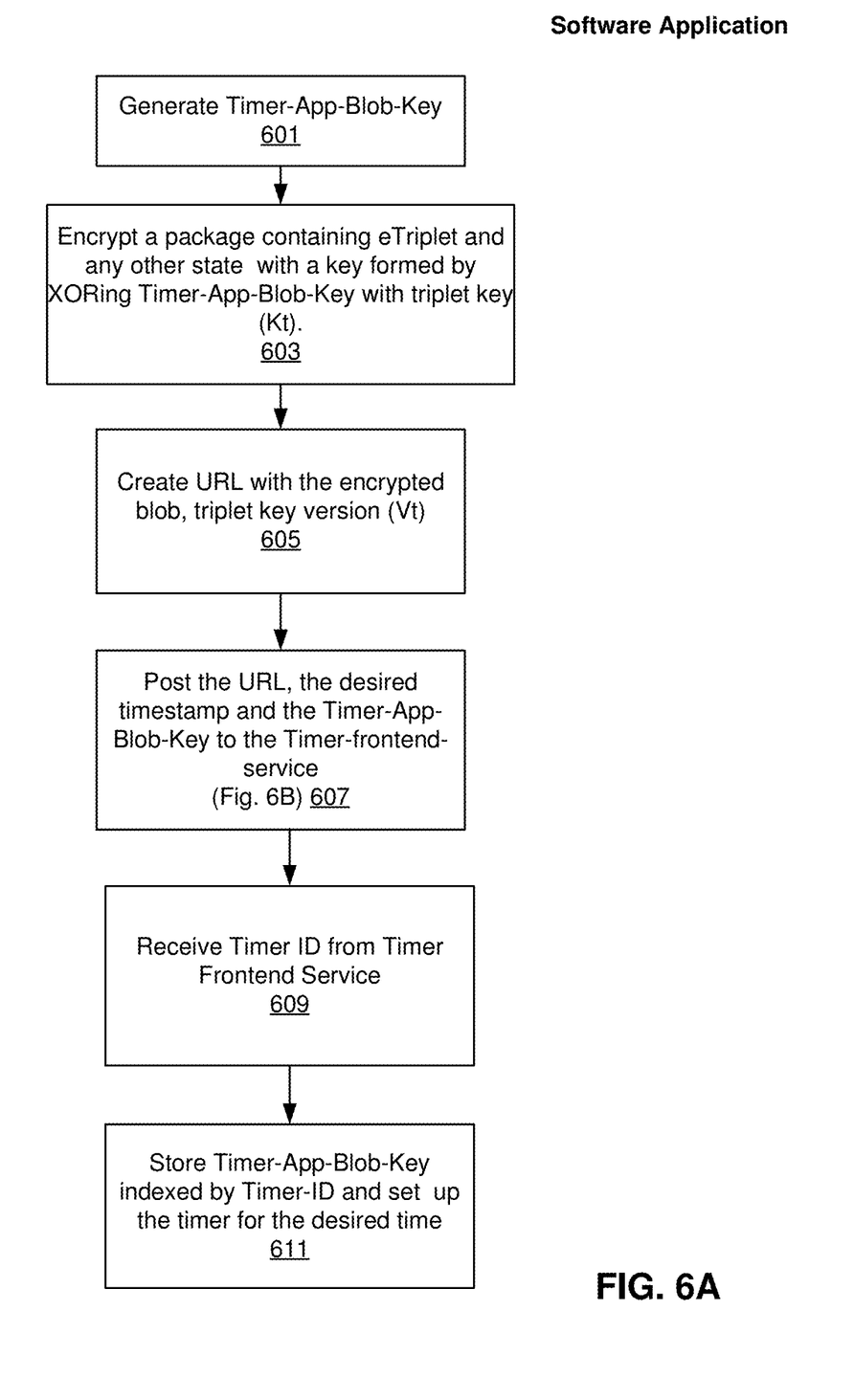
FIGS. 6A, 6B, and 6C illustrate operations performed by the software application server, timer frontend service, and timer storage service, respectively, using a multi-key authentication system, to setup a timer, according to one embodiment of the present invention.
Figure 6B:
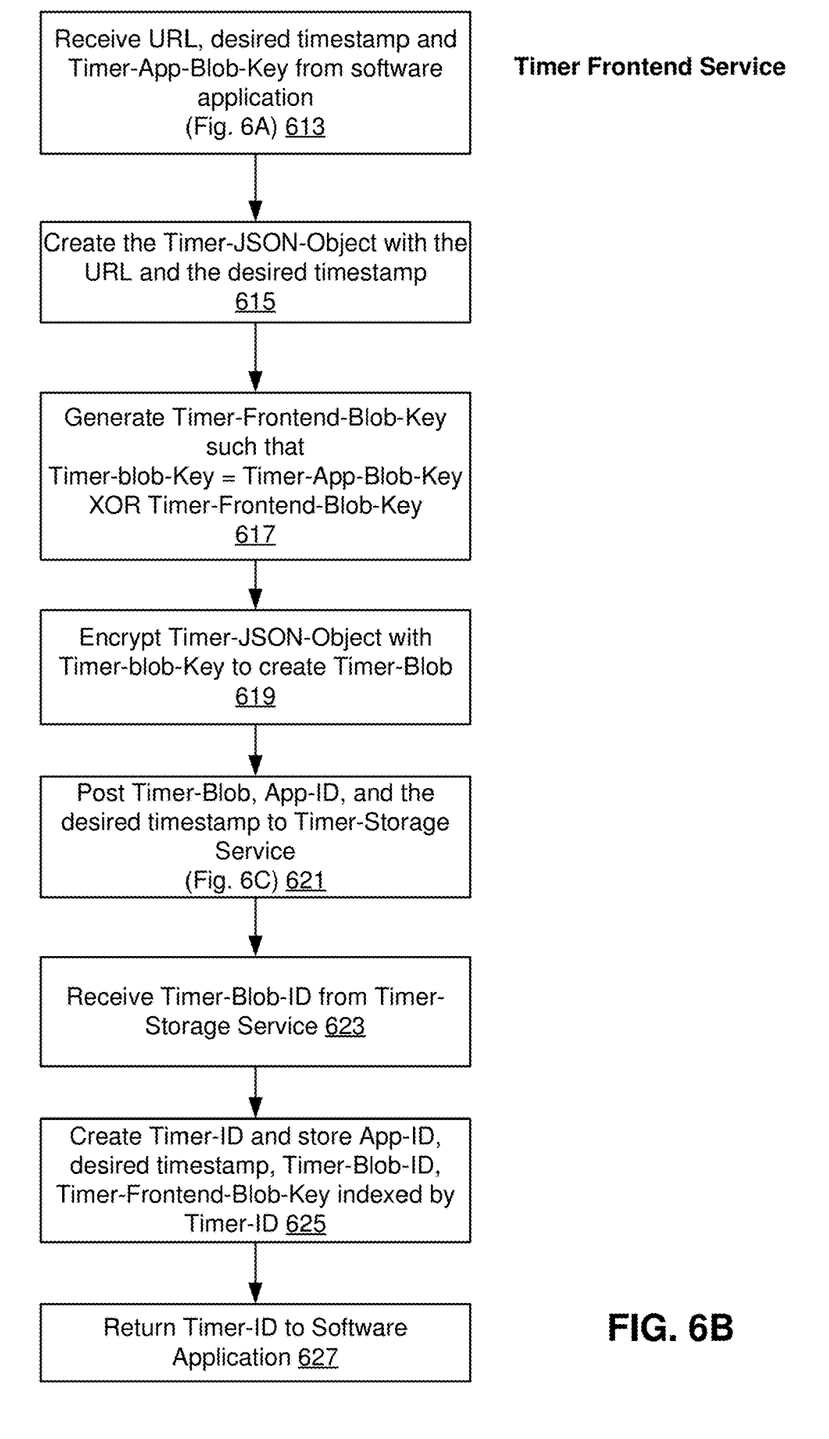
Figure 6C:
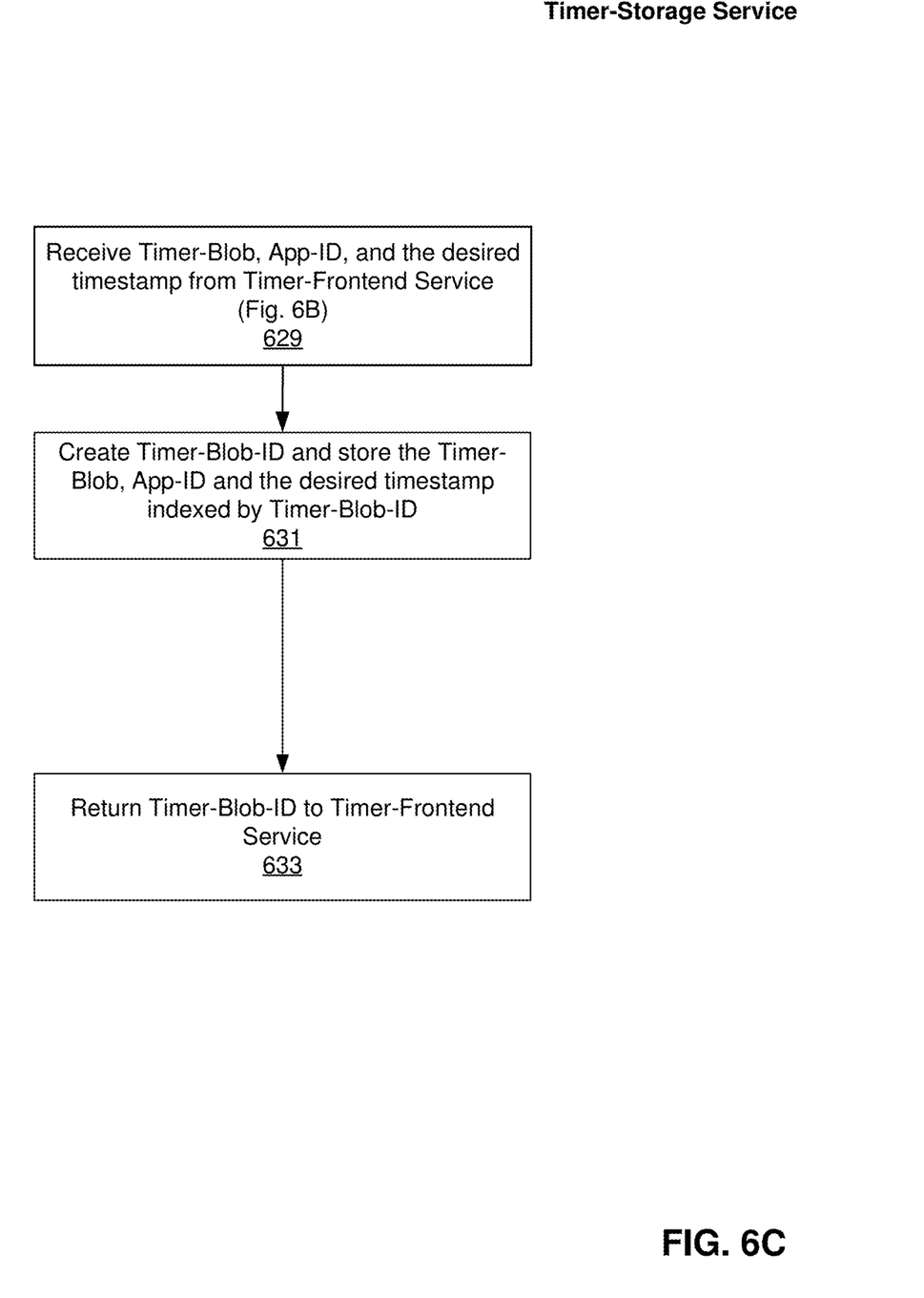

FIGS. 6A, 6B, and 6C illustrate operations performed by the software application server, timer frontend service, and timer storage service, respectively, to set up a timer, using a multi-key authentication system according to one embodiment of the present invention. As illustrated an SSA can use the timer service to get a call back to itself at a desired time. In one embodiment, all calls to frontend and/or backend systems are throttled against malicious activity. Also, all calls are validated and protected by the client cert preconfigured for the SSA. Similarly, any errors or failures with decryption, table look up, and other checks (not shown in FIG. 6A, 6B, or 6C) result in failure with no timer callback to the SSA.

As illustrated in FIG. 6A, to set up an alarm/notification that goes off at a given time, SSA 103 puts together a package that includes the eTriplet and any other state information that may be required. At 601, the SSA generates a cryptographically safe key, the Timer-SSA-blob-key. At 603, it encrypts this package with a key formed by XORing Timer-SSA-blob-Key and the triplet key (Kt). At 605, the SSA creates a URL with the encrypted blob, Kt of version Vt. In one embodiment, the SSA forms a URL in a format:
<HTTPS>://<App-URL>/?p=<Encrypted-Encoded-Blob>&v=<Version-of-the-Kt-used>

Thereafter, at 607, SSA posts the Timer-SSA-blob-key along with the URL and the desired timestamp to the timer frontend service. The timer frontend service accepts the URL, as further illustrated in FIG. 6B. At 609, the SSA receives a timer ID from the timer service. At 611, the SSA then creates a timer with the desired timestamp with the Timer ID and the Timer-SSA-blob-key as the state. In one embodiment, the SSA also stores the handle to the timer in a table if it deems that is needed to satisfy certain scenarios. In another embodiment, the SSA can also just store the necessary items in a table in chronological order, if batch processing is desired.

As illustrated in FIG. 6B, at 613, timer service receives the URL, desired timestamp, and timer-app-blob-key from SSA. At 615, timer service creates a JSON blob with the desired timestamp. In one embodiment, the JSON blob, called the timer JSON object can have the following format:

```
{
 "Callback-URL": "<The URL formed in the above step>",
 "Timestamp": "<Desired Timestamp as a string>",
 "<SSA-ID>" : "<SSA-ID as a string>"
}
```

The timer front end service then generates a cryptographically safe random key called the Timer-frontend-blob-key, as illustrated at 617. In one embodiment, the frontend service XORs this key with the Timer-SSA-blob-key to create the Timer-blob-key and uses that resultant key to encrypt the JSON object to create the Timer-blob, as illustrated at 619.

At 621, the timer frontend service then creates a store-request to the timer storage service by posting the timer-blob along with the SSA-ID and the desired timestamp. At 623, timer frontend service receives the timer-blob-ID. At 625, the timer frontend service creates a unique cryptographically random ID called Timer-ID and stores the SSA-ID encrypted with the Timer-SSA-blob-key, Timer-blob-ID, the frontend-Timer-blob-key and the desired timestamp in a table indexed by the Timer-ID. At 627, the Timer-ID is returned to the calling SSA.

As illustrated in FIG. 6C, at 629, the timer storage service receives the timer-blob, App ID, and the desired timestamp from the timer frontend service. At 631, the timer storage stores the timer-blob against a unique cryptographically random ID called Timer-blob-ID. At 633, timer blob ID is returned to timer-frontend service.

Figure 7:
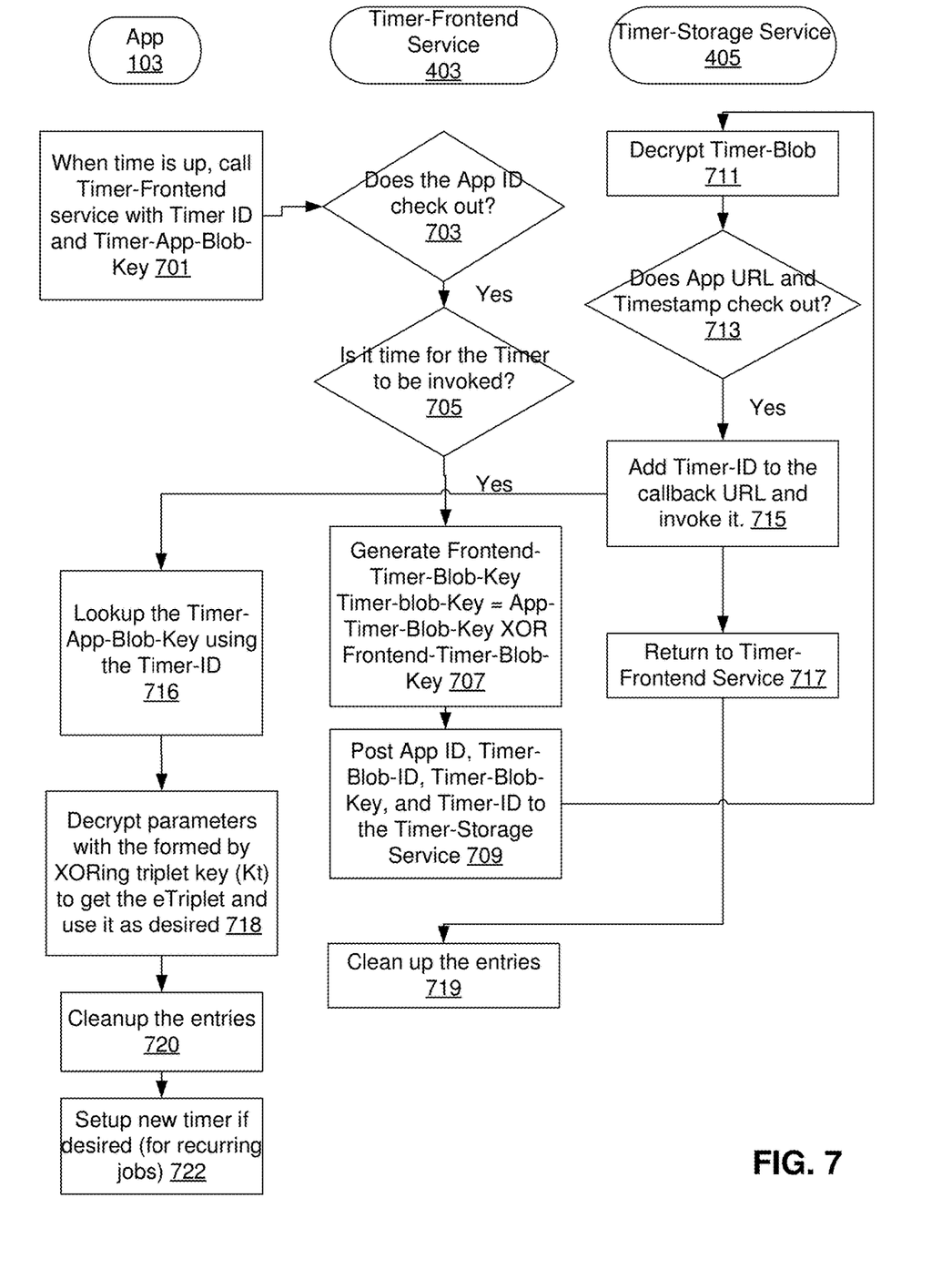
FIG. 7 illustrates triggering a timer in a time based multi-key authentication system, according to one embodiment of the present invention.

FIG. 7 illustrates the process to trigger a timer in a time based multi-key authentication system, according to one embodiment of the present invention. In one embodiment, all calls to frontend and/or backend systems are throttled against malicious activity. Also, all calls are validated and protected by the client certificate or client secret preconfigured for the SSA. Similarly, any errors or failures with decryption, table look up, and other checks (not shown in FIG. 7) result in failure with no timer callback to the SSA.

As illustrated, at 701, when the timer is triggered, the SSA calls the timer frontend service with the Timer-ID and Timer-SSA-blob-key in question. At 703, the timer frontend service retrieves the record indexed by the Timer-ID and after checking that the SSA-ID matches, at 705 it determine whether the current timestamp is within a certain preconfigured tolerance from the stored timestamp so that the timer needs to be invoked. At 707, the timer frontend service recreates the Timer-blob-key by XORing the supplied Timer-SSA-blob-key and the stored Timer-frontend-blob-key. At 709, it posts the SSA-ID, Timer-ID, Timer-blob-ID and the Timer-blob-key to make an Invoke-request to the timer storage service.

Upon receiving an invoke-timer request, at 711, the timer storage service accesses the Timer-blob using the provided Timer-blob-ID, and decrypts the Timer-blob using the provided Timer-blob-key to retrieve the Timer-JSON-object. At 713, upon success, it checks that the SSA-ID matches and the timestamp in the object matches within a certain preconfigured tolerance of the current timestamp. In one embodiment, it also checks that the domain of the URL inside the Timer-JSON-object matches the preconfigured URL domain patterns for the given SSA, so that there is no way to cross-post from one SSA to another. If everything checks out, at 715, the timer storage service calls the SSA by adding Timer-ID as an additional parameter to the URL and invoking it. In one embodiment, this is performed by the timer storage service using its SSL cert as a client cert. At 717, the timer storage service returns success back to the timer frontend service so that that service can clean up the timer on its end, as illustrated at 719. This occurs in all cases.

At 716, when the SSA gets the call from the storage service (from 715), it verifies that the call indeed came the storage service. At 718, it then looks up the entry for the timer using the Timer-ID and computes the decryption key by XORing triplet key (Kt) with the Timer-SSA-Blob-Key from its storage. Using this decryption key, the SSA now has access to the eTriplet. With it, the SSA can access the sensitive data in question and carry out the background task. In all cases, as illustrated at 720, once the data is successfully received, the SSA deletes the entries in its database for the Timer-ID that has been utilized and is no longer needed (to avoid any replays). In one embodiment, at 722, the SSA can set up a new timer if the task is of recurring nature.

Figure 8:
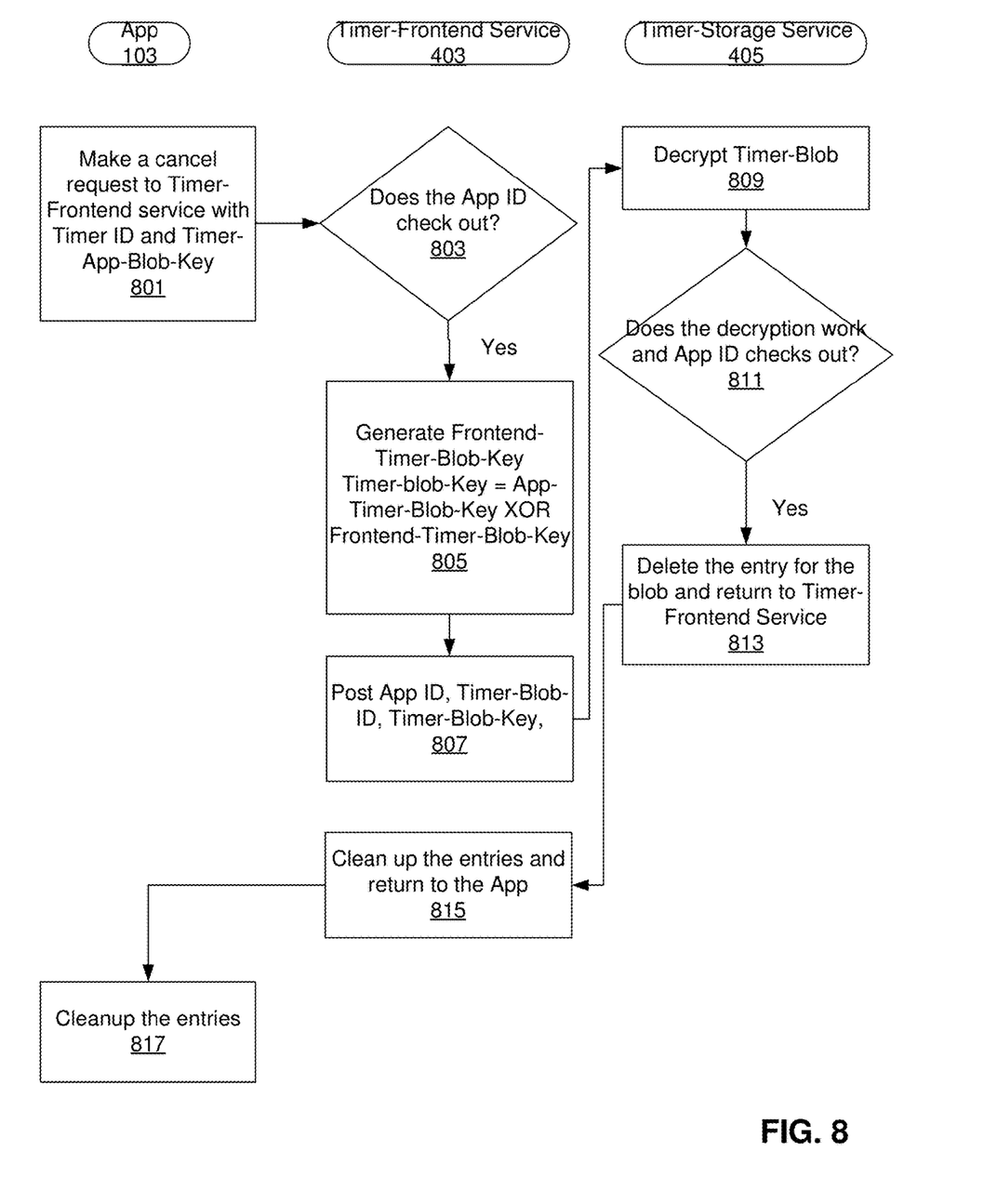
FIG. 8 illustrates canceling a timer, in a time based multi-key authentication system, according to one embodiment of the present invention.

FIG. 8 illustrates the process to cancel a timer in a time based multi-key authentication system, according to one embodiment of the present invention. In one embodiment, all calls to frontend and/or backend systems are throttled against malicious activity. Also, all calls are validated and protected by the client cert preconfigure. for the SSA. Similarly, any errors or failures with decryption, table look up, and other checks (not shown in FIG. 8) result in failure with no timer callback to the SSA.

At 801, when the timer needs to be cancelled, the SSA calls the timer frontend service with the Timer-ID and Timer-SSA-blob-key. At 803, the timer frontend service retrieves the record indexed by the Timer-ID. After checking that the SSA-ID matches, at 805, it recreates the Timer-blob-key by XORing the supplied Timer-SSA-blob-key and the stored Timer-frontend-blob-key. It then, at 807, posts the SSA-ID, Timer-blob-ID and the Timer-blob-key to make an Invoke-request to the timer storage service.

Upon receiving an cancel-timer request, at 809, the timer storage service accesses the Timer-blob using the provided Timer-blob-ID, decrypts the Timer-blob using the provided Timer-blob-key to retrieve the Timer-JSON-object. Upon success, at 811, it checks that the SSA-ID matches and the decryption is successful. Thereafter, at 813, the timer storage service deletes the Timer-Blob entry and returns control to timer frontend service. After successful return, at 815, timer frontend service deletes its entries for the timer, and informs the SSA of successful deletion. The SSA then performs any necessary cleanup operations as illustrated at 817. Whenever a timer is complete, it is important that data is cleaned out at all the end points to disable any chance of a replay attack.

In one embodiment, all timer services throttle and refuse to honor requests if the rate of requests are more than an administratively preconfigured limit for a given SSA. In the case of such throttling, an alert can be sent to the SSA's administrative contacts to warn them of unusual activity. In one embodiment, measures can be in place to catch any unusual request patterns between the timer frontend service and the timer storage service.

Similarly, there can be cleanup operations or processes as part of both timer services that clears out stale entries. When excessive staleness occurs for a given SSA, alerts can be generated to warn the SSA owners. Alerts can be put in place for the timer services as part of the internal monitoring for any unusual staleness across apps. Limits for how far into the future desired-timestamps can be will also be part of the SSA configuration. A request for a timer setup for a timestamp in the past will be summarily ignored.

A person or ordinary skill in the art would appreciate that a batch version of the APIs can be derived, where a plurality of individual requests are batched together. In all cases, the keys and IDs for a given user are distinct and separate to avoid any batched-spillage of sensitive data.

In one embodiment, as an additional measure, SSAs can optionally register with multiple timer services for reasons of scale, security, and reliability or just to control business dependencies. In this embodiment, SSAs can hash each user to a specific timer service provider and use that service for the timer needs on a given user record. Other mechanisms that stripe timers across multiple timer service instances can also be employed.

Table 1 describes the exploit and mitigation when a malicious actor gains privileged access to the SSA's servers using a cloud MKA based system:

TABLE 1

| Exploit | Mitigation |
| --- | --- |
| Cancel the timers, disrupting the service | Throttle cancelation requests at the Timer-frontend service and warn administrators. |
| Create a lot of timers with fake data (real eTriplet is not accessible), thus creating a denial of service | Throttle timer creation requests at the Timer-frontend service and warn administrators. |
| A malicious actor deletes all the timer-app-blob-key records or cancels the handle to the timer | While this can be detected post-facto by scripts on the ID-frontend-service that look at timers that have not been triggered past their timestamps, there is no way to recover the lost data, other than independent backups. |
| A malicious actor/employee gains access to one or more machines. | Simple exploits such as getting access to the key in the key vault and reading/decrypting all the stored information is no longer possible. |
| A malicious actor installs a memory resident program such as a network monitor with administrative privileges on some or all machines | While this threat cannot be eliminated, the scheme greatly slows down the ability to take a dump of the entire database of sensitive secrets - at the minimum, the malicious actor will have to wait for each of the timers to be invoked before it can get a handle to the data. This gives security administrators a much longer time window to catch and eliminate the culprit. Further, if only one or few machines of a set of servers are compromised, the ability of the malicious actor to simply read a whole database of sensitive information is eliminated - only the requests that cross the compromised machines can be exploited. |

Table 2 describes the exploit and mitigation when a malicious actor gains privileged access to the timer frontend service servers using a cloud MKA based system:

TABLE 2

| Exploit | Mitigation |
| --- | --- |
| Delete all timer records from the table for a given app | Create alerts for excessive delete operations, and excessive record-not-found exceptions; Ensure independent backups for recovery. |
| Create a lot of timers with fake data for a given app (real keys are not accessible as they are stripped across the app and Timer-frontend servers), thus creating a denial of service | Throttle timer creation requests for a given app at the Timer-storage-service and create alerts for the case. |

TABLE 2-continued

| Exploit | Mitigation |
| --- | --- |
| A malicious actor/malicious employee gains access to one or more machines. A malicious actor installs a memory resident program such as a network monitor with administrative privileges on some or all machines | Since the Timer-App-Blob-Key is not available on the Timer-frontend server, there is no way for the malicious actor to invoke or cancel any timers or gain access to any data. |

Table 3 describes the exploit and mitigation when a malicious actor gains privileged access to the timer storage service servers using a cloud MKA based system:

TABLE 3

| Exploit | Mitigation |
| --- | --- |
| Delete all timer records from the table for a given app | Create alerts for excessive delete operations, and excessive record-not-found exceptions; Ensure independent backups for recovery. |
| Create a lot of calls to the app with fake data for a given app, thus creating a denial of service | Throttle outgoing timer callback requests for a given app at the Timer-storage-service. |
| A malicious actor/malicious employee gains access to one or more machines. A malicious actor installs a memory resident program such as a network monitor with administrative privileges on some or all machines | Since the Timer-Blob-Key and Timer-ID are not available on the Timer-storage server, there is no way for the malicious actor to invoke or cancel any timers or gain access to any data. |

Therefore, as can be noted, by employing a cloud MKA, no mass disclosure of the eTriplet can ever happen by exploiting the timer services or the SSA making any possible exploit computationally expensive and impracticable.

Figure 9:
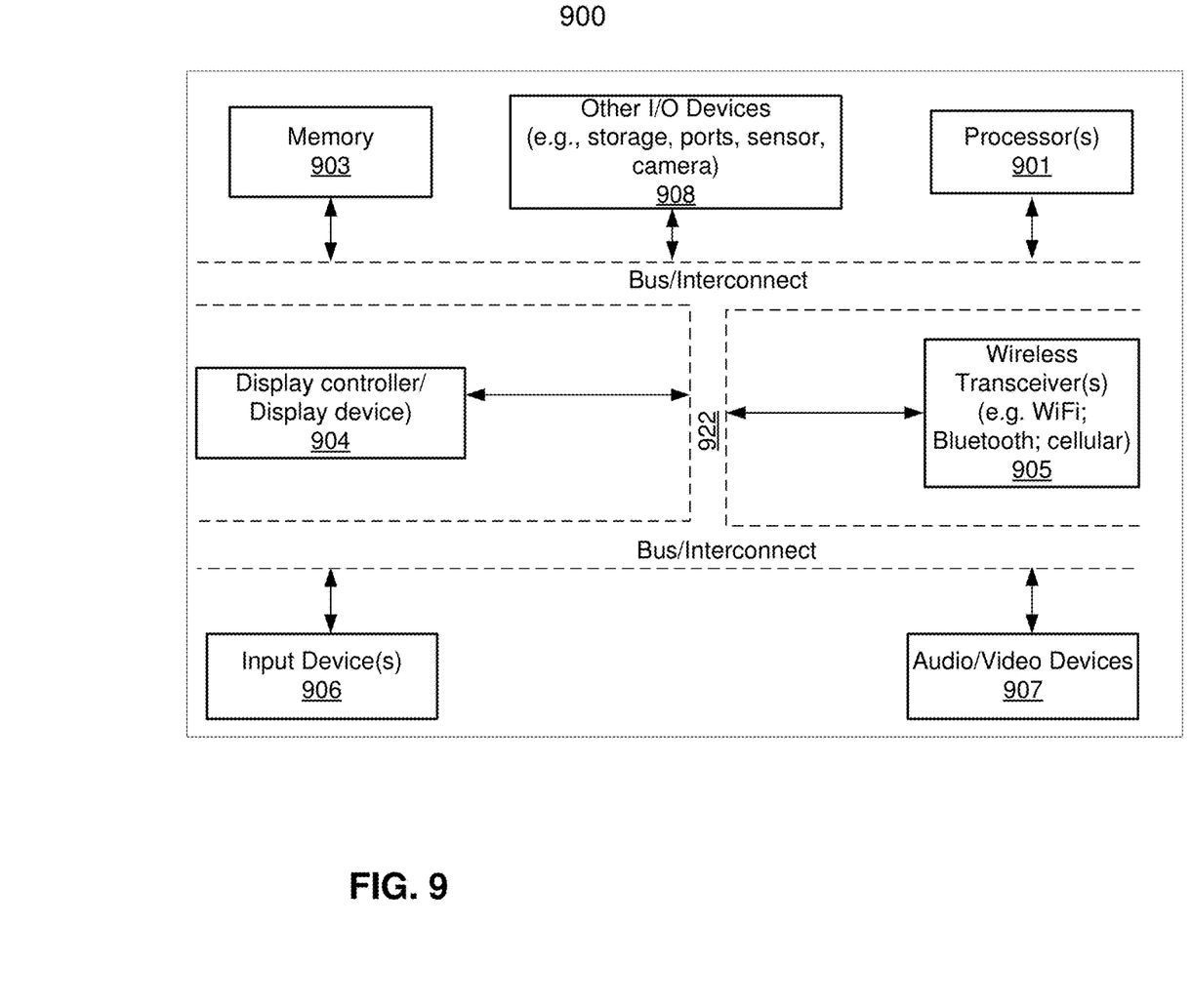
FIG. 9 illustrates a block diagram of a computing system for use in a multi-key authentication system, according to one embodiment of the present invention.

FIG. 9 is a block diagram illustrating a data processing system such as a computing system 900 which may be used with one embodiment of the invention. For example, system 900 can be implemented as part of a cloud MKA system as described herein. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 900 can represent the key escrow service 101, software application server 103, key vault 105, timer service 401, front end service 403, storage service 405, or a combination thereof. System 900 can have a distributed architecture having a plurality of nodes coupled through a network, or all of its components may be integrated into a single unit. Computing system 900 can represent any of the data processing systems described above performing any of the processes or methods described above. In one embodiment, computer system 900 can be implemented as integrated circuits (ICs), discrete electronic devices, modules adapted to a circuit board such as a motherboard, an add-in card of the computer system, and/or as components that can be incorporated within a chassis/case of any computing device. System 900 is intended to show a high level view of many components of any data processing unit or computer system. However, it is to be understood that additional or fewer components may be present in certain implementations and furthermore, different arrangement of the components shown may occur in other implementations. System 900 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 900 includes processor 901, memory 903, and devices 905-908 via a bus or an interconnect 922. Processor 901 can represent a single processor or multiple processors with a single processor core or multiple processor cores included therein. Processor 901 can represent one or more general-purpose processors such as a microprocessor, a central processing unit (CPU), Micro Controller Unit (MCU), etc. Processor 901 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901, can also be a low power multi-core processor socket such as an ultra low voltage processor, may act as a main processing unit and central hub for communication with the various components of the system. Such processor can be implemented as a system on chip (SoC).

Processor 901 is configured to execute instructions for performing the operations and methods discussed herein. System 900 further includes a graphics interface that communicates with graphics subsystem 904, which may include a display controller and/or a display device. Processor 901 can communicate with memory 903, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 903 may store information including sequences of executable program instructions that are executed by processor 901, or any other device. System 900 can further include IO devices such as devices 905-908, including wireless transceiver(s) 905, input device(s) 906, audio IO device(s) 907, and other IO devices 908.

Wireless transceiver 905 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 906 can include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). Other optional devices 908 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 908 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 922 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, in one embodiment, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A system, comprising:
    a memory device;
    a processing system, comprising at least one hardware core coupled to the memory device, wherein the processing system is configured to:
    retrieve a first key, the first key stored at first key management service;
    retrieve a second key, the second key stored at a second key management service;
    generate a third key, wherein the third key generated by associating the first key with the second key;
    encrypt a key blob using the third key, the key blob including a user key, wherein the user key is used to encrypt sensitive information, the sensitive information is data that needs to be protected; and
    store the key blob, wherein the key blob is indexed using a first identifier;
    store a second identifier, wherein the second identifier includes the first identifier and identification information of the first and second keys; and
    upon receiving a time identifier associated with the second identifier, transmit the second identifier to a requestor that requires decrypting the sensitive information.

2. The system of claim 1, wherein the first key is a key related to a service or application, and wherein the second key is an escrowed key.

3. The system of claim 1, wherein the first and second keys are associated by applying at least one of a logic operator or algorithm on the first and second keys to generate the third key.

4. The system of claim 1, wherein the second identifier is transmitted
    upon verification that the second identifier was requested within a predetermined period of time.

5. The system of claim 1, wherein the third key is generated at least by applying an exclusive or (XOR) based logic operator on the first and second keys.

6. A method, comprising:
- retrieving a first key, the first key stored at first key management service;
- retrieving a second key, the second key stored at a second key management service;
- generating a third key, wherein the third key generated by associating the first key with the second key;
- encrypting a key blob using the third key, the key blob including a user key, wherein the user key is used to encrypt sensitive information, the sensitive information is data that needs to be protected; and
- storing the key blob, wherein the key blob is indexed using a first identifier;
- storing a second identifier, wherein the second identifier includes the first identifier and identification information of the first and second keys; and
- upon receiving a time identifier associated with the second identifier, transmitting the second identifier to a requestor that requires decrypting the sensitive information.

7. The method of claim 6, wherein the first key is a key related to a service or application, and wherein the second key is an escrowed key.

8. The method of claim 6, wherein the first and second keys are associated by applying at least one of a logic operator or algorithm on the first and second keys to generate the third key.

9. The method of claim 6, wherein the second identifier is transmitted:
- upon verification that the second identifier was requested within a predetermined period of time.

10. The method of claim 6, wherein the third key is generated at least by applying an exclusive or (XOR) based logic operator on the first and second keys.

11. A non-transitory computer readable medium comprising instructions, which when executed by a processing system having at least one core executes a method, comprising:
- retrieving a first key, the first key stored at first key management service;
- retrieving a second key, the second key stored at a second key management service;
- generating a third key, wherein the third key generated by associating the first key with the second key;
- encrypting a key blob using the third key, the key blob including a user key, wherein the user key is used to encrypt sensitive information, the sensitive information is data that needs to be protected; and
- storing the key blob, wherein the key blob is indexed using a first identifier;
- storing a second identifier, wherein the second identifier includes the first identifier and identification information of the first and second keys; and
- upon receiving a time identifier associated with the second identifier, transmitting the second identifier to a requestor that requires decrypting the sensitive information.

12. The non-transitory computer readable medium of claim 11, wherein the first key is a key related to a service or application, and wherein the second key is an escrowed key.

13. The non-transitory computer readable medium of claim 11, wherein the first and second keys are associated by applying at least one of a logic operator or algorithm on the first and second keys to generate the third key.

14. The non-transitory computer readable medium of claim 11,
- upon verification that the second identifier was requested within a predetermined period of time.

* * * * *